United States Patent [19]
Tippmann et al.

[11] Patent Number: 5,939,125
[45] Date of Patent: Aug. 17, 1999

[54] APPARATUS AND METHOD FOR COOKING AND HOLDING FOOD ITEMS

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 09/064,502

[22] Filed: Apr. 23, 1998

[51] Int. Cl.⁶ .............................. A23L 1/00; A47J 27/00
[52] U.S. Cl. .............................. 426/523; 99/448; 99/483; 165/171; 165/919; 426/520
[58] Field of Search .................................... 426/520, 523; 99/331, 448, 483; 165/171, 918, 919

[56] References Cited

U.S. PATENT DOCUMENTS 5,086,693  2/1992  Tippmann et al. ............... 165/919
5,628,241  5/1997  Chavanaz et al. ................. 99/483

*Primary Examiner*—George Yeung
*Attorney, Agent, or Firm*—Joseph J. Baker

[57] ABSTRACT

An apparatus is disclosed having a plurality of elongated plates arranged to form elongated shelves to cook food items and additional plates arranged as troughs to hold the cooked food items for sale, each plate has a through bore connected to form a continuous passageway. A heat absorbing fluid at a constant temperature is circulated through the passageway of each plate to thereby heat the food items.

12 Claims, 3 Drawing Sheets

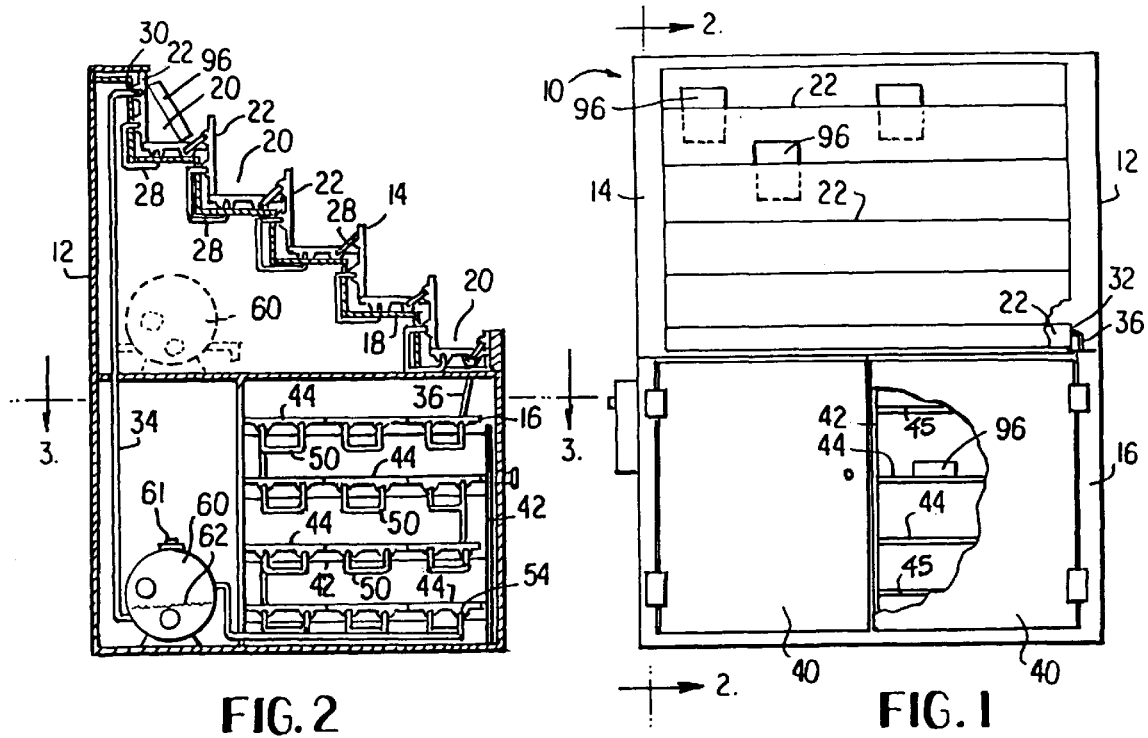
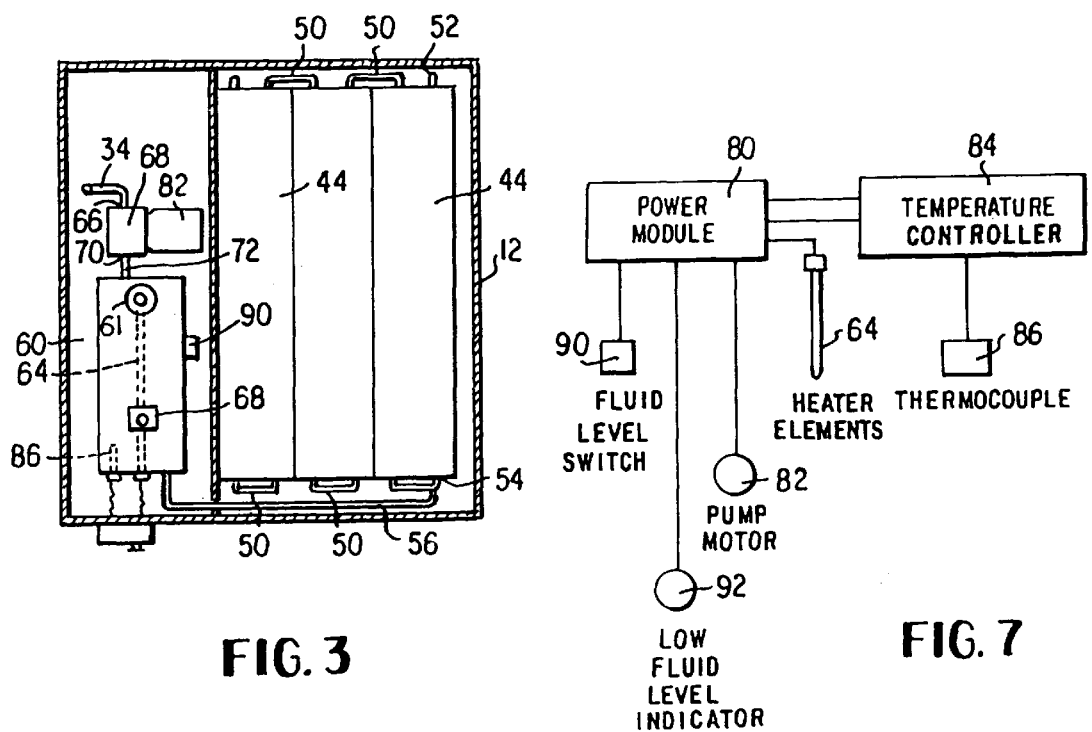

5,939,125

APPARATUS AND METHOD FOR COOKING AND HOLDING FOOD ITEMS

BACKGROUND OF THE INVENTION

This invention relates to an apparatus for transferring heat to food articles and, more particularly, to a novel apparatus for initially cooking food articles and for holding the food articles at a preferred temperature for prolonged time periods during display of the items for sale.

The novel method of cooking and holding food articles for which the present apparatus is utilized is disclosed in U.S. Pat. Nos. 4,210,675, 4,224,862 and 4,278,697, and the novel apparatus for heating and circulating heat absorbing fluid through the present apparatus is disclosed in U.S. Pat. Nos. 5,086,693 and 5,201,364, the contents of all of which are to be incorporated herein by reference in their entirety.

Briefly, the U.S. Department of Agriculture has long determined that there is considerable danger of spoilage and Salmonella (food poisoning bacteria) development in food articles which are held for even short periods of time at temperatures ranging between 40° F. and 145° F. Prior art apparatus utilizing, for example, electrically heated air, steam, etc., have encountered problems in attempting to maintain warm food articles held in the apparatus at temperatures above 140° F. within a temperature range of +5° F. without also causing considerable undesired additional cooking or "overcooking" of them as pointed out in the aforementioned patents. The method comprises storing cooked meat or other food articles in a chamber having closure means intended to be repeatedly and frequently opened and closed, supporting the cooked food articles on support means located within the chamber, forcing a heated liquid heat-transferring medium through radiator means located adjacent to and on opposite sides of the support means, and maintaining the temperature above 140° F. and within a temperature range of +5° F. The apparatus disclosed in the latest of the aforementioned patents for practicing the afore-stated method consisted basically of mounting a plurality of support means in vertical stacked relationship to each other. Each of the support means consisted of a plate through which heated fluid is passed. The plates are connected in parallel relationship to each other and all parallel plates are connected in series relationship to the pump and the sump containing the heated liquid. An electric heater element in the sump connected to a control circuit is used to heat and maintain the temperature constant of the heat transferring medium.

The novel apparatus of the present invention which employs the method and apparatus for heating and circulating a heat transfer medium to cook and hold food articles as afore-described, comprises in one embodiment a display rack secured to a frame and having a plurality of troughs formed by plates arranged in step-like fashion to hold a plurality of food items, such as sandwiches, etc., prior to sale. The troughs enable the food items placed in the trough to be warmed by heat radiating and conducting from the surface of the three plates comprising the trough. The plates have at least one and preferably two or more through bores each of which is connected to an adjacent through bore so that a continuous passageway is formed through all the through bores of all of the plates comprising the troughs and shelves to a single inlet and outlet connection. This inlet and outlet is connected to an apparatus for heating and circulating a heat transferring medium such as that disclosed in our U.S. Pat. Nos. 5,086,693 and 5,201,364.

In another embodiment, the shelves beneath the display are eliminated and the afore-referenced apparatus for heating and circulating the heat transferring medium is connected directly to the inlet and outlet of the plates comprising the troughs of the display rack.

It is therefore the primary object of the present invention to provide a superior apparatus for cooking and holding food articles.

It is another object of the present invention to provide a novel display rack for food items prior to sale wherein the items are maintained in a heated state with no additional cooking thereof.

It is yet another object of the present invention to provide a novel display rack for food items prior to sale having a beneath cabinet means wherein food items can be cooked and also held prior to being transferred to the display rack for sale.

Other objects and advantages of the present invention will become apparent and obvious from a study of the following description and accompanying drawings, which are merely illustrative of the present invention.

BRIEF DESCRIPTION OF THE DRAWINGS

FIG. 1 is a front elevational view with partial cutaway of the cooking and holding apparatus for food articles of the present invention;

FIG. 2 is a side elevational view taken along the lines 2—2 of FIG. 1;

FIG. 3 is a cross-sectional view taken along the lines 3—3 of FIG. 2;

FIG. 7 is a block diagram of the elements for circulating and heating a heat absorbing fluid.

DETAILED DESCRIPTION OF THE INVENTION

Figure 4:
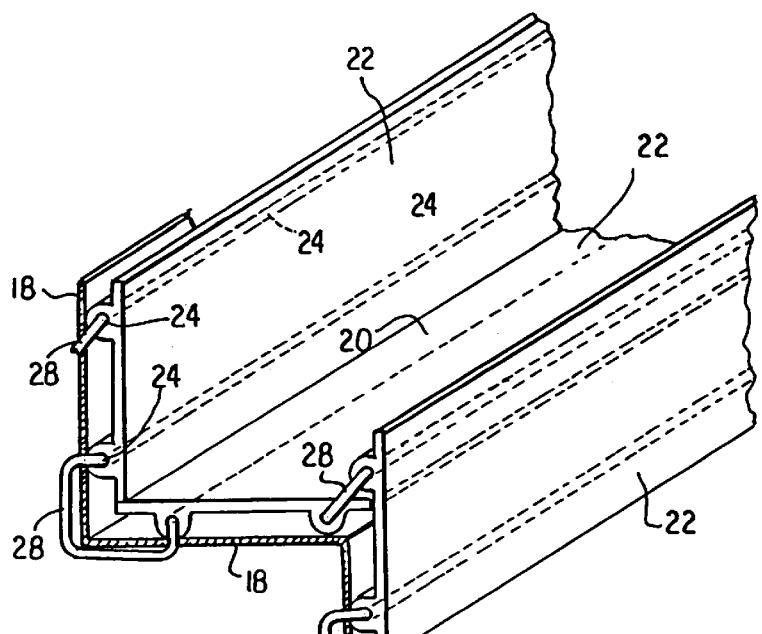
FIG. 4 is a partial perspective view of the positioning and interconnection of the plates forming the troughs of the present invention.

Referring now to the drawings where like characters of reference indicate like elements of each of the several views, numeral 10 refers generally to the apparatus for cooking and holding food items for sale.

Figure 5:
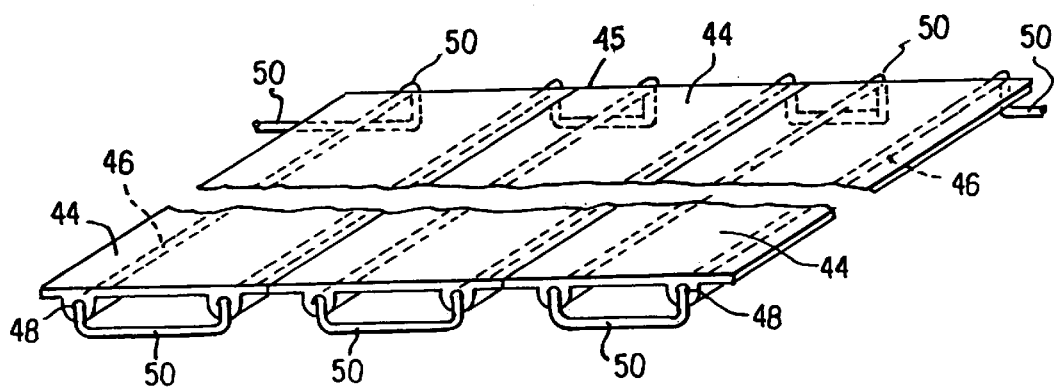
FIG. 5 is a partial perspective view of the positioning and series interconnection of the plates forming the shelves of the present invention.

The apparatus 10 shown in FIGS. 1 and 2 comprises a frame member 12 for supporting a display section 14 positioned above a cabinet section 16. The display section 14 has a step-like support area 18 on which are mounted longitudinally-extending three-sided troughs 20. Each trough 20, as can best be seen by referring to FIG. 4, consists of three longitudinally-extending plates 22, two of which are mounted adjacent the support 18 and at right angles to the third which is positioned horizontally and also rests on support 18. Alternatively, the plates 22 can be secured together along their edges and the support 18 eliminated. Each plate 22 is made, in its preferred form, out of extruded aluminum and has at least one and preferably two or more through bores 24 extending the length thereof for the passage of a heat transfer fluid, as will be more fully described later. The ends 26 of the through bores 24 adjacent each other are shown in FIGS. 2–4 connected in series by piping 28 to thereby form in essence a continuous, serpentine passageway through all the plates 22 forming the display section 12. The connection of the ends 26 to a header system of piping shown in FIG. 5 could also effectively be used. The respective inlet 30 and outlet 32 of the serpentine passageway formed by individual through bores 24 is connected by piping 34, 36, respectively, to other elements of the apparatus 10, as will presently be described.

Figure 6:
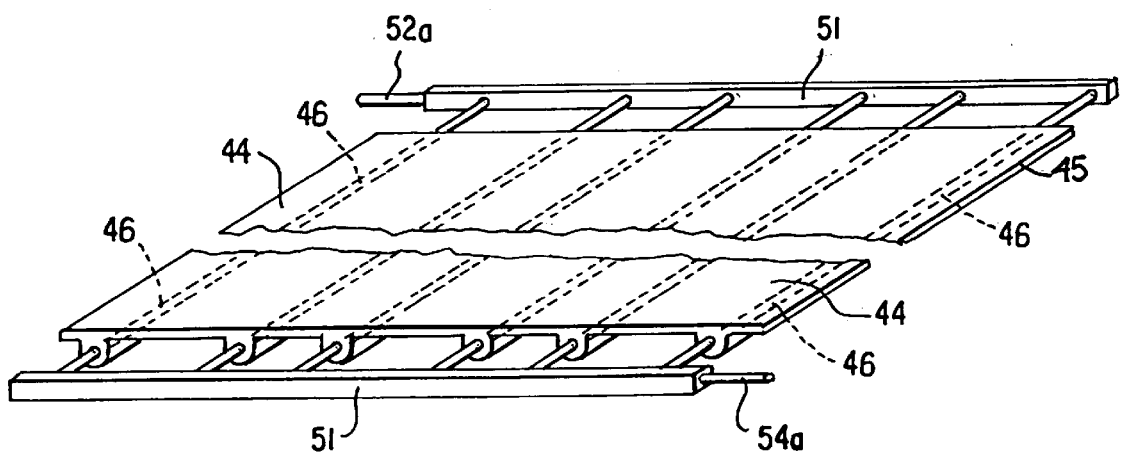
FIG. 6 is a partial perspective view of the positioning and parallel interconnection of the plates forming shelves of the present invention.

The cabinet section 16 comprises an enclosure having doors 40 and a frame member 42 for supporting a plurality of longitudinally-extending, horizontally-disposed plates 44 which are similar in construction to plates 22 employed in the display section 14. The plates 44 are arranged in side-by-side relationship, as can best be seen by referring to FIG. 5, to form shelves 45 and have at least one and preferably two or more longitudinally-extending through bores 46 for the transmission of heat absorbing fluid, as will be more fully described later. The ends 48 of the through bores 46 adjacent each other are connected in series by piping 50 to also form a continuous, serpentine passageway through all of the plates 44 forming all of the shelves 45. The inlet 52 of the serpentine passageway formed by individual through bores 46 is connected by piping 36 from the outlet 32 to thereby form a continuous passageway from the inlet 30 to the outlet 54 in series fashion through all of the through bores 24, 26 of plates 22, 44, respectively. Alternatively, a header system 51 shown in FIG. 6 could be used in place of the piping 50 thereby connecting the ends of each through bore 46 in parallel rather than the series connection and having the inlet 52a and outlet 54a.

Referring now to FIGS. 2 and 3, a reservoir 60 is provided having a fill cap 61 for holding a supply of heat transfer fluid 62 which can be heated by electrical heating element 64 extending into the reservoir. The fluid is normally plain water or a mixture of water and glycol. The transfer fluid 62 can also be heated by a gas burner (not shown) or steam, if desired. The inlet or supply piping 34 is connected to the discharge outlet 66 of a pump 68. The inlet side 70 of the pump 68 is connected to the reservoir 60 and the outlet or return piping 56 connects the outlet 54 to the reservoir 60 to thereby complete a closed loop fluid transfer system through all of the plates 22, 44 forming the display 14 and cabinet 16 sections. Thus, the pump 68 withdraws heated fluid from the reservoir 60 through pipe 72 and forces it into inlet 30 of plates 22 via supply piping 34, through all of the plates 22 and 44, and outlet 54 and back to the reservoir 60 via return piping 56.

An electrical control circuit is shown in FIG. 7 in block diagram form and includes a power module 80 for controlling the electrical current to the heating element 64, the motor 82 of the pump 68 in response to temperature set on the temperature controller 84, and the temperature sensed by the thermocouple 86 in the transfer fluid 62 in reservoir 60. In order to visually inspect the level of the transfer fluid 62 in the reservoir 60, a cite-glass 88 is provided extending into the reservoir 60 and a fluid level float-type switch 90 is also positioned in the reservoir to energize a warning light in the form of a low fluid level indicator 92 if the transfer fluid 62 falls below a predetermined level to thereby prevent damage to the heater element 64. A switch 94 connects the power module 80 to a source of electrical current.

In operation, the temperature controller 84 is set at a preferred temperature which is the temperature the operator wants to achieve and/or maintain at the center of the food article 96. When the cabinet section 16 is employed to initially cook food articles 96 or to complete the cooking of food articles that have been previously partially cooked, this preferred temperature is the so-called "doneness temperature" of the food article 96, e.g. for chicken parts, this "doneness temperature" is 165° F.; for beef parts, this "doneness temperature" ranges from 130° F. to 145° F. However, it should be understood that it is often preferred to hold food articles which have been previously fully cooked at a "holding temperature" that is lower than their "doneness temperature". With chicken parts, for example, the "holding temperature" is 150° F. or 36° F. below the "doneness temperature" of 165° F. Thus, food articles 96 can be cooked to their "doneness temperature" in cabinet section 16 at the aforementioned required temperature and after the temperature has been reduced to the "holding temperature", keep some of the food articles in the cabinet section 16 and place some in the troughs 20 of the display section 14 for sale where they can be maintained or "held" without undergoing any additional cooking. The food article 96 can be, for example, a chicken sandwich in a bag or the like. As can thus be seen, the novel apparatus 10 of the present invention can thus cook food articles on the shelves 45 and, after a reduction in temperature, "hold" the articles on the shelves 45 or in the troughs 20 for long periods of time or, if the food articles have been cooked elsewhere, simply hold the articles on the shelves 45 or troughs 20 at the "holding temperature" to enable them to be purchased warm but not overcooked.

It is also contemplated that if the display section 14 only is to be used on a countertop or the like, then cabinet section 16 would be eliminated and the reservoir 60 and associated pump 68 etc. would be located beneath the troughs 22 as shown in the phantom lines of FIG. 2.

Applicants have thus described in detail their apparatus for heating food articles to cook them and/or hold them for purchase by a customer at a warm temperature that does not overcook the article.

It is apparent that many modifications and variations of this invention as hereinbefore set forth may be made without departing from the spirit and scope thereof. The specific embodiments described are given by way of example only and the invention is limited only by the terms of the appended claims.

What we claim is:

1. An apparatus for cooking and holding food items at a preset temperature comprising:

a) a plurality of elongated plates arranged in step-like fashion to form elongated troughs, each of said plates having at least one through bore, b) means for connecting the through bores of each of said elongated plates to form a continuous fluid passageway having an inlet and an outlet, and c) means connected between said inlet and said outlet for circulating a heat absorbing fluid at a constant temperature through said passageway to thereby heat said food items positioned in said troughs.

2. An apparatus as set forth in claim 1 further comprising:

a) a plurality of elongated plates arranged in side-by-side relationship to form a plurality of spaced-apart shelves for heating food items, each of said plates having at least one through bore for the passage of said heat absorbing fluid and said shelves being supported in an enclosable cabinet means, and b) means for connecting said through bores in each of said elongated plates forming said shelves to form a continuous fluid passageway having an inlet and an outlet, said inlet and said outlet of said shelf plates also being connected to said circulating means.

3. An apparatus as set forth in claim 2, wherein said elongated plates have their passageways connected in series relationship.

4. An apparatus as set forth in claim 2, wherein said elongated plates have their passageways connected in parallel relationship.

5. An apparatus as set forth in claim 1, wherein said circulating means comprises:
   a) reservoir means for holding a quantity of heat absorbing fluid;
   b) fluid pump means;
   c) conduit means fluid-connecting said reservoir, said inlet and outset of said fluid passageway and said pump means to form a closed-loop fluid transfer means;
   d) means for heating said fluid in said reservoir means; and
   e) control means connected to said heating means for controlling the desired temperature to which the fluid is to be heated and maintained by said heating means.

6. An apparatus as set forth in claim 1, wherein said heat absorbing fluid is water.

7. An apparatus for cooking and holding food items at a preset temperature comprising:
   a) a plurality of elongated plates arranged in side-by-side relationship to form a plurality of spaced-apart shelves for heating food items, each of said plates having at least one through bore for the passage of a heat absorbing fluid and said shelves being supported in an enclosable cabinet means,
   b) a plurality of elongated plates arranged in step-like fashion to form a plurality of elongated troughs, each of said plates having at least one through bore and each of said troughs extending above said cabinet means,
   c) means for connecting the through bores of each of said elongated plates forming said shelves and troughs to form a continuous fluid passageway, having an inlet and an outlet, and
   d) means connected between said inlet and said outlet for circulating a heat absorbing fluid at a constant temperature through said passageway to thereby heat said food items placed on said shelves or in said troughs.

8. An apparatus as set forth in claim 7, wherein said elongated plates have their passageways connected in series relationship.

9. An apparatus as set forth in claim 7, wherein said elongated plates have their passageways connected in parallel relationship.

10. An apparatus as set forth in claim 7, wherein said circulating means comprises:
    a) reservoir means for holding a quantity of heat absorbing fluid;
    b) fluid pump means;
    c) conduit means fluid-connecting said reservoir, said inlet and outset of said fluid passageway and said pump means to form a closed-loop fluid transfer means;
    d) means for heating said fluid in said reservoir means; and
    e) control means connected to said heating means for controlling the desired temperature to which the fluid is to be heated and maintained by said heating means.

11. An apparatus as set forth in claim 7, wherein said heat absorbing fluid is water.

12. A method for cooking and holding food items at a preset temperature comprising:
    a) providing a plurality of elongated plates arranged in step-like fashion to form elongated troughs, each of said plates having at least one through bore,
    b) connecting the through bores of each of said elongated plates to form a continuous fluid passageway having an inlet and an outlet, and
    c) connecting said inlet and said outlet to a means for circulating a heat absorbing fluid at a constant temperature through said passageway to thereby heat said food items positioned in said troughs.

* * * * *